(12) United States Patent
Peterson et al.

(10) Patent No.: US 8,797,322 B2
(45) Date of Patent: Aug. 5, 2014

(54) SYSTEMS AND METHODS OF DEFINING RAYS FOR RAY TRACING RENDERING

(75) Inventors: Luke Tilman Peterson, Oakland, CA (US); James Alexander McCombe, San Francisco, CA (US)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 958 days.

(21) Appl. No.: 12/822,750

(22) Filed: Jun. 24, 2010

(65) Prior Publication Data

US 2010/0328310 A1 Dec. 30, 2010

Related U.S. Application Data

(60) Provisional application No. 61/219,870, filed on Jun. 24, 2009.

(51) Int. Cl.
*G06T 15/50* (2011.01)
*G06T 15/06* (2011.01)

(52) U.S. Cl.
CPC ...................................... *G06T 15/06* (2013.01)
USPC ............................ 345/426; 345/419; 345/545

(58) Field of Classification Search
None
See application file for complete search history.

(56) References Cited

U.S. PATENT DOCUMENTS

| | | | |
|---|---|---|---|
| 7,030,879 | B1 | 4/2006 | Pharr |
| 7,917,535 | B1 * | 3/2011 | Gregory et al. ............... 707/791 |
| 2007/0018980 | A1 * | 1/2007 | Berteig et al. ............... 345/426 |
| 2009/0049452 | A1 * | 2/2009 | Kriegel et al. ............... 719/313 |
| 2009/0096788 | A1 | 4/2009 | Salsbury et al. |

FOREIGN PATENT DOCUMENTS

WO WO 2008/037599 A1 4/2008

OTHER PUBLICATIONS

Parker, Steven G., Solomon Boulos, James Bigler, and Austin Robison. "RTLS: a ray tracing shading language." In Interactive Ray Tracing, 2007. RT'07. IEEE Symposium on, pp. 149-160. IEEE, 2007.*

Andreas Dietrich, Ingo Wald, Carsten Benthin and Philipp Slusallek, "The OpenRT Application Programming Interface—Towards a Common API for Interactive Ray Tracing -" Proceedings of the 2003 OpenSG Symposium (Darmstadt, Germany), Eurographics Association, 2003, pp. 23-31.

(Continued)

*Primary Examiner* — Ulka Chauhan
*Assistant Examiner* — Sultana M Zalalee
(74) *Attorney, Agent, or Firm* — Michael S. Garrabrants

(57) ABSTRACT

Some aspects pertain to ray data storage for ray tracing rendering. Attribute data for a first ray can be stored. To define a second ray, data defining such can comprise a reference to the first ray (in one example) and attribute source information indicative of shared attributes between the first and second rays. The attribute source information can be shared among many rays, and can be selected based on ray type. Definition data for unshared attributes can be explicit with the second ray. A plurality of rays can reference one ray for shared attribute data. Referencing rays can be counted and decremented as referencing rays complete. Shared attributes can be indicated with masks. Interface modules can service ray data read and write requests made by shaders, and shaders can explicitly reference attributes of rays, without using such interfacing modules. Data structures can be used as attribute sources without being associated with particular rays, and can be defined and selected as attribute data sources based on ray type.

19 Claims, 4 Drawing Sheets

(56) References Cited

OTHER PUBLICATIONS

Andreas Dietrich, Ingo Wald, Carsten Benthin and Philipp Slusallek, "The OpenRT Application Programming Interlace—Towards a Common API for Interactive Ray Tracing -" OpenSG 2003, Darmstadt, Germany (Available online at http://graphics.cs.uni-sb.de/fileadmin/cguds/papers/2003/opensg03/TheOpenRTAPI_OpenSG2003.ppt, last visited Sep. 21, 2009).

James Arvo and David Kirk, "Fast Ray Tracing by Ray Classification," ACM SIGGRAPH Computer Graphics 21 (4), Jul. 1987, pp. 55-64.

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

\* cited by examiner

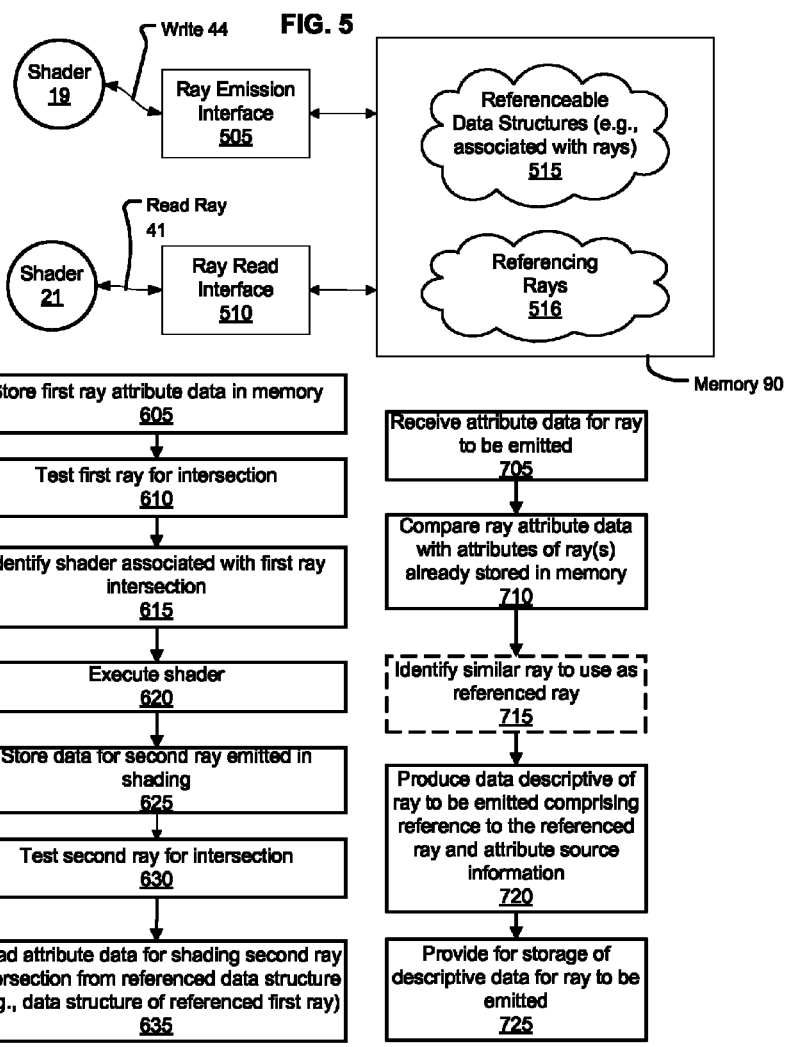

SYSTEMS AND METHODS OF DEFINING RAYS FOR RAY TRACING RENDERING

CROSS REFERENCE TO RELATED APPLICATIONS

This application claims priority from U.S. provisional application No. 61/219,870, entitled "SYSTEMS AND METHODS OF DEFINING RAYS FOR RAY TRACING RENDERING", and filed on Jun. 24, 2009, which is incorporated by reference in its entirety, for all purposes, herein.

BACKGROUND

1. Field

The following relates generally to ray tracing systems that can be used, for example, in rendering 2-D representations of 3-D scenes, and more specifically to aspects of how rays to be traced in such systems can be specified, stored, and so on.

2. Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle.

Virtual rays of light are traced into the scene from a view point ("a camera"); each ray is issued to travel through a respective pixel of the 2-D representation, on which that ray can have an effect. The rays are tested for intersection with scene primitives to identify a first intersected primitive for each ray, if any.

After identifying an intersection for a given ray, a shader associated with that primitive determines what happens next. For example, if the primitive is part of a mirror, then a reflection ray is issued to determine whether light is hitting the intersected point from a luminaire, or in more complicated situations, subsurface reflection, and scattering can be modeled, which may cause issuance of different rays to be intersection tested. By further example, if a surface of an object were rough, not smooth, then a shader for that object may issue rays to model a diffuse reflection on that surface. As such, finding an intersection between a ray and a primitive is a step in determining whether and what kind of light energy may reach a pixel by virtue of a given ray, since what light is hitting that primitive still needs to be determined.

Thus, most conventional algorithms build a tree of rays in flight when ray tracing a scene, where the tree continues along each branch until it leaves the scene or hits a luminaire that does not issue new rays. Then, for those branches that hit light emissive objects ("luminaires"), the branches are rolled up through the primitive intersections, determining along the way what effect each primitive intersection has on the light that hits it. Finally, a color and intensity of light for the originally issued camera ray can be determined and stored in the buffer. The tree of rays is generally created by a number of material shaders. For example, a ray is outputted from a camera, and traced to find an intersection with a primitive, which is bound to a shader. That shader can issue another ray for testing, and it waits on the stack for color information to be returned for its ray (which can involve a number of other shaders, down the ray tree).

Normally, origins and directions for the rays need to be specified in order to test the rays for intersection. Other information for such rays may also be used. Computation and memory costs for setting up data for a large number of rays can be high, and it would be helpful to be able to reduce them.

SUMMARY

To enable higher quality rendering with ray tracing, ray tracing renderers would beneficially be able to better interface with shader code modules and be better able to store and manage ray data stored in memory. In some aspects, these disclosures relate to approaches for interfacing shader code modules with a ray tracing renderer, and for managing ray data produced during scene rendering.

One method aspect relates to processing rays in a ray tracing renderer, and comprises storing attribute data for a first ray in a location of a memory, and identifying a shader module to execute based on an intersection testing result for the first ray in a 3-D scene. The method also comprises providing for execution of the shader module in a processor, wherein the execution results in a second ray for intersection testing. The method also comprises storing data for the second ray comprising a reference to a source of attributes for the second ray. Access is made to attribute source information indicating which second ray attributes are to be obtained from the source, and sourcing, from the referenced source of attributes, the attributes indicated by the attribute source information for use in shading an intersection involving the second ray.

The reference can be to a data structure associated with a referenced ray. The reference can include identifying information for the referenced ray, and/or memory address information for a location where attributes for the referenced ray are stored. The attribute source information can be common for a number of rays. In some cases, the rays referencing the attribute source information can be of a single ray type. Different attribute source information can be provided for each ray type.

Another method aspect relates to accepting ray data from shader modules, and comprises storing in one or more locations in a memory a plurality of attributes identified as being available for reference by rays upon their emission. The method also comprises storing data defining a ray, the definition data for the second ray comprising a reference to at least one of the stored attributes, and running a shader code module in response to an intersection testing result for the ray. The method also comprises using the reference to the at least one stored attribute to obtain data defining that attribute for use by the shader code module.

An example system aspect relates managing ray memory in rendering with ray tracing, and comprises a memory for storing ray attribute data; and a processor configurable with computer executable shader code modules to produce rays to be intersection tested in a 3-D scene, the processor interfacing with the memory. The interface between the processor and the memory comprises a module for storing definition data for a first ray. The module can be implemented in an API. The definition data may comprise identification of an attribute of the first ray that is present in a separate data structure already stored in the memory, a reference to the separate data structure, and data describing an attribute of the first ray distinct from attributes stored in that separate data structure.

A further example aspect relates to computer executable instructions comprising a shader code module for configuring a processor. The shader code module may comprise computer executable code to receive identifying information for a first ray that caused the shader code module to run by virtue of intersecting a primitive associated with the shader code module, and computer executable code for reading attribute source information for the first ray from a memory location storing information for the first ray. The module may further comprise computer executable code for parsing the attribute source information to determine whether the first ray references an attribute of a second ray, and parsing an identifier for the second ray from the attribute source information if so, and computer executable code for reading data descriptive of the referenced attribute from a memory location identified using the second ray identifier. The module may also comprise computer executable code for computing a shading effect using the referenced second ray attribute in shading the first ray intersection.

Any such aspects can be scaled to handling a plurality of rays, all referencing attribute data of the first ray, where each ray of the plurality includes attribute source information that describes which first ray attributes that ray is sharing.

Such aspects may comprise maintaining a count of rays referencing a given data structure (e.g., one associated with a particular ray). The count can be incremented when another ray is emitted that references the data structure, and can be decremented upon a ray that references the first ray being completed (e.g., either by shading an intersection for it, or by completing intersection testing without an intersection that needs to be shaded). When the count indicates that no further rays reference the first ray, the data structure can be allowed to be overwritten, or can be evicted.

Rays or data structure can be flagged as being referenceable, such that they are available to be referenced by other rays.

A further aspect includes computer readable media for storing computer executable code comprising computer executable code to receive identifying information for a first ray that caused the shader code module to run by virtue of intersecting a primitive associated with the shader code module. The media also stores computer executable code for reading attribute source information for the first ray from a memory location storing information for the first ray. The media also stores computer executable code for parsing the attribute source information to determine whether the first ray references an attribute of a second ray, and parsing an identifier for the second ray from the attribute source information if so. The media also stores computer executable code for reading data descriptive of the referenced attribute from a memory location identified using the second ray identifier. The media also stores computer executable code for computing a shading effect using the referenced second ray attribute in shading the first ray intersection.

Another aspect includes a computer readable medium comprising computer executable code for configuring a processor to provide an interfacing for shaders to a rendering system, methods and systems for such. The code may comprise a ray data read module for configuring a processor to obtain ray data from a memory on behalf of a shader code module. The ray data read module is for receiving an identifier for a to-be-shaded ray, obtaining a first data structure located based on the identifier, parsing a portion of the first data structure to determine whether the to-be-shaded ray references an attribute located at a separate location in memory, and if so, then obtaining a reference to the separate memory location from the first data structure, and reading the attribute from the separate memory location on behalf of the shader code module.

Such code may further comprise a ray data write module for causing the processor to write ray data to the memory on behalf of shader code modules by receiving data from those shader code modules comprising definition data for rays to be intersection tested, which comprises respective references to memory locations storing attributes referenced by the rays, and values for unreferenced attributes.

Such code may further comprise a ray data write module for configuring the processor to write ray data to the memory on behalf of shader code modules, the write module updating a count of a number of referencing rays associated with the referenced ray.

Such a ray data read module may be further provided for configuring the processor to defer reading the attribute data from the second data structure until a plurality of requests for that attribute data await fulfillment.

In any of the above aspects, ray attributes may comprise any of an origin and a direction for the first ray, a reference to a screen pixel, a vector describing attenuation of light energy along a path traced from a virtual camera, and computer executable code to be executed after completion of the shader code module.

For each of the above exemplary aspects, other embodiments may be provided. For example, if an example included a method, then other embodiments may include tangible computer readable medium embodying code for implementing such a method, while still further examples may comprise machines for executing such a method.

BRIEF DESCRIPTION OF THE DRAWINGS

FIG. 5 depicts an approach where interfacing modules can abstract a ray memory storage subsystem from shaders;

FIG. 6 depicts a method exemplifying system operation with a ray attribute referencing approach to ray specification;

FIG. 7 depicts a method for discussing other aspects of ray referencing approaches.

DETAILED DESCRIPTION

Figure 1:
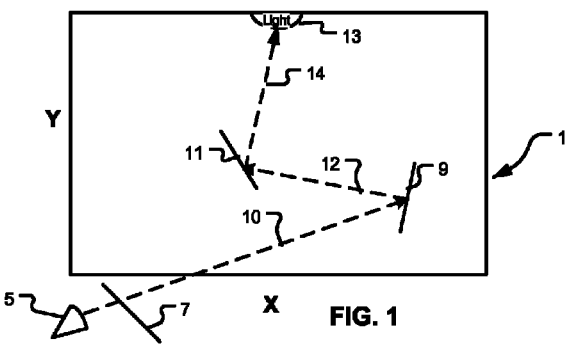
FIG. 1 depicts a toy scene providing an example of tracing rays through a series of intersections with primitives.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the inventions.

Goals of ray tracing-based rendering include continuing to produce one or more of higher frame rates and higher screen resolution, and supporting increasingly complex lighting effects. For example, a full HD resolution (1920×1080 pixels) has over 2 million pixels. Each pixel of the scene can have many rays emitted from the camera that are associated with it. Thus, rendering such a scene can involve initially testing many millions of camera rays alone, followed by much higher numbers of rays that are emitted by shaders identified based on object intersections with camera rays, and in turn rays subsequently emitted by shaders (shaders, in some examples, are modules of computer code that describe actions that are to be taken in response to a ray intersecting a scene object, with which one or more shaders are associated).

Shaders frequently emit rays to be intersection tested, to determine various conditions, such as lighting conditions, in a scene. For example, shaders can perform diffuse lighting tests, such as Monte Carlo diffuse lighting, which involves emission of a number of rays to test ambient lighting conditions. Shaders may emit rays to test whether an intersection point is shadowed by another object for known light sources in the scene. Shaders also can model complex materials characteristics, such as subsurface scattering for skin, reflection, refraction, and so on. Each of these functions can involve emission of rays that need to be intersection tested in the scene. Thus, rendering a full HD high resolution 2-D representation of a complex scene can involve processing hundreds of millions or more rays. Reducing storage requirements and setup costs for rays emitted during a frame rendering may be beneficial.

In one aspect, the following description concerns ways to improve generation and storage of data descriptive of rays during progress of scene rendering. One example includes that data descriptive of a ray can be stored in a memory (a "referenced ray"), and other rays can be emitted, which reference that ray ("referencing rays"). Linking to the referenced ray allows importing attributes of it for use in shading an intersection involving a referencing ray. Similarly, rays can reference a data structure in memory for attributes that can be imported for use in shading. As used herein, shading an intersection refers to running code, such as a code module, in response to an intersection testing result, such as hit or a miss result indicating respectively either that there was an intersection with a scene primitive, or that the ray missed primitives (and for example, could be determined to hit a scene background). In some examples, the module to be executed can be associated with the particular primitive intersected, and in other examples, the module executed can be the same for all primitive hits. Implementations can include both approaches. An amount of storage required to store a referencing ray can be less than storing a completely specified referenced ray; however, there is overhead in implementing such a references scheme.

Other benefits to the disclosed approaches can accrue in non-recursive ray tracing rendering, as explained below.

In a preferred approach, a renderer that non-recursively ray traces a scene can be provided. For explanation, in recursive ray tracing, a complete tree of rays and shaders are identified, where the tree terminates when its leaf rays fail to intersect an object or intersect an object that emits light and emits no further rays. Then the tree can be rolled up, as all the intermediate shaders have their results available, they can in turn complete. By contrast, a non-recursive ray tracer, as that term is used here, does not need to maintain a full tree of shader state, and passes information about shading effects in a "forward" direction, rather than "rolling up" that information after light energy emitted on a particular ray path is identified.

In either case, there may be reasons and/or benefits to using aspects disclosed herein. However, these aspects are particularly helpful for non-recursive ray tracing, as non-recursive ray tracing can benefit from inclusion of ray information in a data structure stored in a memory, and referencing that data structure by a variety of other rays based on information indicating whether those other rays share some of the attributes of that ray.

FIG. 1 depicts an example toy scene 1 comprising a first minor 9, a second mirror 11, and a light 13. A camera 5 sends a ray 10 for testing into the scene. Ray 130 passes through a 2-D image plane 7, which is comprised of pixels, and is to be rendered from scene 1. A pixel of image plane 7 is associated with ray 10 (e.g., ray 10 can be viewed as passing through one of the pixels of plane 7). Ray 10 is tested for intersection against objects composing the scene until it is determined to intersect with minor 9 (i.e., a closest intersection of ray 10 and an object in the scene is with minor 9.)

Mirror 9 is associated with a shader describing its behavior. Such a shader can be a collection of computer instructions that are executed to implement/describe behavior. For example, a simple minor reflects all light hitting it according to Snell's law and a shader can describe such behavior. Since tracing occurs from camera towards a light, rather than vice versa, producing minor-like behavior would require issuing another ray to determine what light is hitting the intersection point at reflection angle determined by an incident direction of ray 10 on minor 9. Thus, a shader for a mirror would model that physical behavior with instructions to be executed and associated data to be accessed when needed.

In a recursive ray tracing scheme, a shader can cause emission of a ray by calling a "Trace Ray" function call, which ultimately returns a color value. Because the algorithm is recursive, the color value for a particular call of the function is not filled in until other, later, calls to the Trace Ray function call complete, such that data is then available to formulate the next color value to be fed up the tree, and so on.

Thus, in this example, ray 12 would be spawned, and intersection tested until determining a closest intersection (here, with minor 11). A shader for mirror 11 would then be called (could be the same shader code as for minor 9). Shader 11 would issue ray 14, which when intersection tested, is determined to intersect light 13.

Although FIG. 1 illustrates that only one ray is emitted by each shader, each shader can emit a number of rays. In a recursive ray tracing renderer, a number of rays still can be emitted by the same shader, and if processing resource availability permits, all those rays can be intersection tested in parallel (even though non-recursive ray tracing allows greater parallelism by decoupling dependencies between parent and child rays, e.g., between ray 10 and ray 12). As rendering of the scene continues, there likely will be an exponential explosion of state as tracing of children of those rays commences, and so on (e.g., 10 rays emitted by one shader can each hit a shader that emits 10 more, and those 100 can each hit shaders that emit 10 more rays, and so on). However, at least to some degree, rays emitted by a given shader can be traced in parallel, even if their child rays cannot be.

Referenced Ray Attributes

Figure 2:
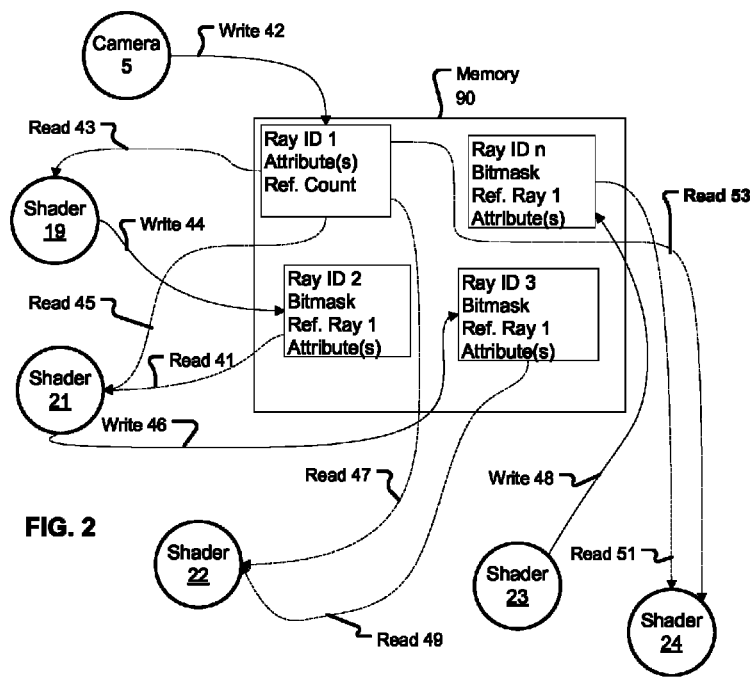
FIG. 2 depicts shader execution to specify rays using references to other rays and attribute source information.

FIG. 2 depicts a rendering situation in which a camera and a number of shaders can emit rays using an approach wherein rays can be specified by referencing a data structure located in memory that is otherwise not associated with such rays. In some cases, that data structure can be associated with another ray, such as a parent ray of a given ray. Generally, in the examples that follow, the example of referencing another ray's attribute data is used, but these aspects also include referencing such a data structure, even if not associated with another ray. In FIG. 2, a camera 5 emits ray 1, and data for ray 1 is written (42) to a memory 90. Data for ray 1 comprises attributes and can also comprise a field for storing a reference count, which will be further described below. Ray 1 is intersection tested (not separately depicted here) and a shader 19 is identified based on an intersection for ray 1 (e.g., by associated with an intersected primitive). Shader 19 obtains attributes for ray 1 through a read 43 from memory, may perform processing, and then produces a second ray (Ray ID 2) to be intersection tested, for which data is written (44) to memory 90. Data for the second ray comprises a bitmask, a reference to ray 1, and possibly data for one or more attributes.

As will be described below, the bitmask comprises a field for each attribute which the second ray can have, and specifies whether that attribute is copied from the first ray, or is specified independently in the data structure for the second ray. The reference can identify a memory location of the first ray or can be an index that allows identification of a storage location for first ray attributes.

A count can be maintained for a number of rays that reference a given ray. In situations where there is a reference count maintained with the first ray, that count can be incremented. The incrementing can be accomplished by shader 19 calling an increment function with a reference to the first ray, or by a function called by shader 19 for emitting the second ray, which will increment the count during the ray emission process.

Rendering continues with tracing of the second ray, and ultimately a shader 21 is identified for an intersection involving the second ray. Shader 21 reads (44) data for the second ray, including the reference to the first ray, and the bitmask. Using the bitmask to identify attributes of the second ray shared with the first ray, and hence having their data stored with the first ray, shader 21 can read (45) those shared attributes from the first ray memory location, and use them during shading. Shader 21 then also can emit a ray for testing (ray ID 3), and write (46) data for the emitted ray to memory 90. Data for the third ray also may comprise a bitmask, a reference to the first ray, and one or more attributes. Shader 22 can be identified based on an intersection involving the third ray, and it can obtain (read 47) attributes identified based on the bitmask associated with the third ray from the location referenced (the location for the first ray). It also can directly read (read 49) and incorporate attributes from the location for the third ray.

Separately from series of shaders (camera 5, shader 19, shader 21, and shader 22), shader 23 also can run and emit a ray (ray ID n) to be intersection tested, using write 48, and cause data for that ray to be stored in memory 90. This ray also can reference the first ray, but this ray need not be related to the first ray (e.g., shader 23 need not have run due to an intersection involving a ray from the series of shaders identified above. After the ray emitted by shader 23 is tested, and a shader 24 is identified for an intersection involving that ray, data for ray ID n can be read (51) from the ray ID n location, and determine from attribute sourcing information there (e.g., a mask) what attributes, if any, are to be read (53) from a referenced ray.

As shown by the example of FIG. 2, a number of rays can be emitted, all of which reference another ray for data descriptive of one or more ray attributes. In practical situations, a much higher number of rays would be emitted, such that memory savings from referencing attributes in another ray can be valuable. As further shown, in some cases, a ray referenced for attributes can be related to a referencing ray, for example in a parent-child relationship. However, in other examples, a shader can emit a ray that references another ray, without there being any pre-existing logical relationship between the emitted and referenced rays. Still further, an example where a ray can reference attributes (e.g., an attribute block or set) associated with another ray was disclosed above. However, other aspects can include providing an attribute set for storage in a memory that is referenceable by rays, but is not necessarily associated with any given ray.

Also, it was shown that the various shaders of FIG. 2 can perform reads and writes on memory 90. Such reads and writes can be performed by ray reference management logic that provides ray attribute data to shaders, and received such data from shaders. Or, shaders can read and write memory 90 through typical mechanisms available and without particular modifications for the purposes described here.

In sum, attribute source information allows identification of which attributes are to be sourced from a given source of attributes. Attribute source information can be shared among a plurality of rays, and can be a global construct that is available for reference. For example, all rays of a given type can use the same attribute source information that indicates which attributes are to be obtained by reference for a given particular ray. Then, that particular ray can use its own source (e.g., a parent ray) to obtain its attributes. For example, attribute source information can indicate that rays of a shadow ray type are to obtain their origin from referenced source, while a direction can be explicitly defined for each ray. Of course, a variety of other ray types can be provided, at varying degrees of granularity. For example, types could include a shadow ray type of each source of light in the scene.

Figure 3:
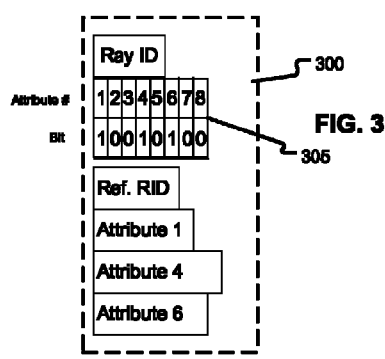
FIG. 3 depicts an example data structure for rays that allows ray referencing and ray attribute source specification.

FIG. 3 depicts more details concerning example information that can be included in a data structure 300 for storing in memory 90 that is representative of a ray. In the example of FIG. 3, data structure 300 may comprise a ray identifier (ray ID). The ray ID may be related to a location in memory 90, or it may be chosen arbitrarily, and a mapping maintained between the ray ID and a location in memory 90. In some cases, the ray ID may refer to a group of memory locations and a search can be conducted among those possible locations for a matching ray ID; for example, various interleaving or bank-based memory schemes can be used.

Data structure 300 may further comprise attribute source specifying information 305, which can be implemented as a bitmask, for example. In FIG. 3, such information 305 is depicted in an example where the ray has 8 attributes and a bit is provided for each attribute. A value in the bit location for a given attribute determines whether that attribute is referenced or is locally specified. Further, a ray reference ID is provided, which identifies from what ray referenced attributes are to be sourced. In the example data structure of FIG. 3, some ray attributes are sourced locally, while others are referenced. In this example, bits 1, 4 and 6 of the mask are binary 1, which indicates local sourcing, while the rest of the bits are 0, indicating referenced attributes. Thus, information for attributes 1, 4, and 6 are provided in the data structure. Selection of using any given bit or bit combination to indicate a referenced attribute is a matter of implementation.

As such, when a shader would use attributes of the ray specified in data structure 300, any attributes that it may need either would be stored directly with data structure 300 or would be available by reference from the referenced ray. Although some implementations can simply load all available attributes when commencing shading, other implementations can instead obtain parameters only when needed by a particular shader. The implementation can depend on whether a majority of shaders generally use most of the attributes. Also, if a large number of rays referencing a given ray are being shaded, then the data already may be available from a fast memory, such as a cache memory, and would be a relatively low latency memory access. In some implementations, accessing a larger chunk of memory may not be more costly than accessing a smaller chunk, based on read size considerations of the implementing architecture and other similar considerations. Therefore, these exemplary aspects can be implemented where beneficial, but are not required.

Figure 4:
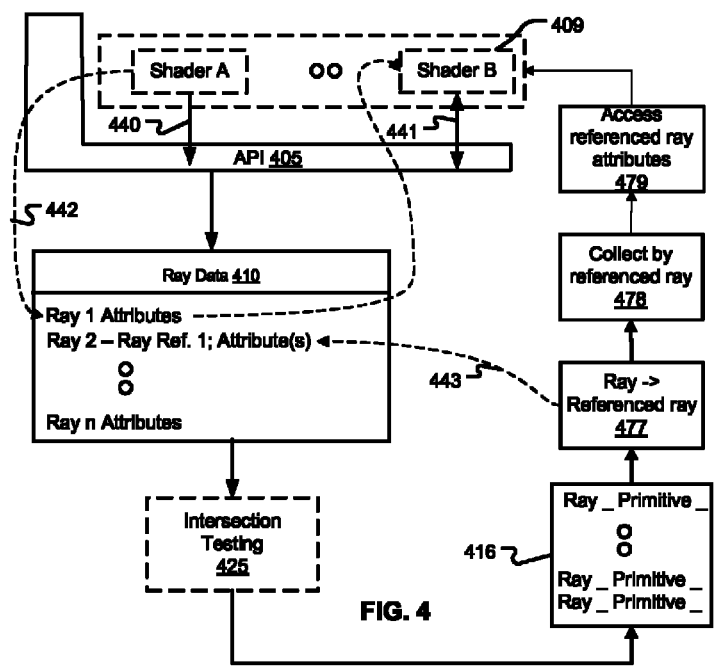
FIG. 4 depicts a system oriented example where an API interfaces shaders with a rendering system, and ray attribute data can be stored and retrieved through references to other rays.

FIG. 4 depicts an example where an API 405 is used by shaders to interface with a rendering system comprising a memory that can store ray data 410, a computing resource for intersection testing 425 of rays, and a computing resource 409 for executing the shaders (FIG. 4 does not imply that physically distinct computing resources are available, and implementations may comprise a general purpose computer that can be configured for both intersection testing and shading). FIG. 4 depicts that shader A can use a call 440 for emitting ray data through API 405 for storage of ray 1, and its attribute data, as depicted by dashed line 442. Ray 1 is intersection tested in resource 425. Intersection testing resource identifies an intersection of the ray and a primitive, and can output information identifying the primitive. In this example, the ray can be identified using its ray ID and the primitive can be identified with a primitive ID. A queue 416 of such ray/primitive identification pairs awaiting shading can be maintained.

In 477, a ray referenced by a ray identified from queue 416 can be determined. Such determination can involve a read 443 from memory to obtain referenced ray information. For example, a ray/primitive identifier pair can be obtained from queue 416, and as described with respect to FIG. 3, a data structure for the identified ray can be obtained, and in that data structure, there can be a referenced ray identifier. That referenced ray identifier is used to obtain attributes indicated as being referenced from that ray.

However, in one implementation, rather than immediately obtaining the referenced attributes with a memory read, the read can be deferred. For example, a read can be deferred to wait for other rays that also have completed intersection testing, need to be shaded, and also reference the same ray. For example, if a number of sibling rays were emitted, all referencing the same parent ray in different intersection testing threads, then it may be beneficial to allow shading of other intersections while waiting for more of the sibling rays to complete intersection testing, and need the parent ray attributes during their shading processes. Thus, 478 depicts collecting rays ready for shading with other ready rays that all reference a common ray. After several, or a pre-determined number of rays have been accumulated, then data for the referenced ray can be fetched.

In another example, data for the referenced ray (e.g., ray 1 of FIG. 4) can be fetched in order to begin shading the first intersection involving that ray. During that process, a reference count from the data structure for the referenced ray can be read, and a determination can be made whether or not to cache in a faster memory the attributes of the referenced ray based on the reference count. For example, a highly referenced ray would be more likely to be more frequently, and maintaining attribute data for that ray in memory may be beneficial.

Depending on an implementation of the intersection testing 425, intersection testing results for sibling rays may return within similar timeframes or at disparate times. In implementations where sibling rays may return within a similar timeframe, then it may be beneficial to begin a fetch when sibling results start to return, and cache those results to be made available for shading other sibling rays that would generally reference the same ray.

Ultimately, a memory access 479 will be made to obtain the parent ray attributes (or more generally, attributes from a referenced data structure). Each shader for a ray that referenced some of the attributes can determine which referenced ray attributes to use. Such aspects are exemplified by provision of the accessed ray attributes to Shader B, which represents a shader for Ray 2, which references ray 1 as shown by stored ray data 410. As discussed above, such memory access may be provided by a function that accesses memory on behalf of shaders, for assembling data needed in execution.

FIG. 5 depicts a system architecture providing a ray emission interface module 505 and a ray read interface interface module 510, which shaders may use respectively for emitting rays to be intersection tested, and for obtaining ray data for a ray involved in an intersection that caused that shader to run. Each of the emission module 505 and the read module 510 interface with memory 90, which is depicted here as storing a group of referenceable rays and a group of referencing rays 516 that reference one or more of the referenceable rays. In a particular example based on FIG. 2, shader 19 emitted a ray for intersection testing through write 44 to memory 90, and shader 21 read ray data from memory 90 with read 41. FIG. 2 illustrated an example where these shaders (and other shaders depicted there) were capable of reading and writing directly from and to memory 90, such that shaders were aware of how attributes for rays were actually stored in memory.

FIG. 5 depicts an example where read 510 and emit 505 interfaces abstract memory 90 from shaders, such that shaders need not be aware of, or otherwise manage how ray data is maintained or stored.

For example, when shader 19 uses write 44, ray emit interface 505 receives data provided by shader 19 through write 44 that defines a ray to be emitted. The definition data can include an origin, a direction, values for other attributes, and other information, such as a ray identifier which the to-be-emitted ray will use for attribute sourcing. In other examples, write 44 can include a more restricted information set, such as origin and direction information, and an indication that other attributes are to be sourced from a ray that caused the shader to run. For example, a particular shader instance may have been run because a particular ray intersected a primitive bound to that shader code. Therefore, data may be maintained about what ray caused that shader instance to run, and that data may be used during emission of rays from that shader instance.

Ray emission interface 505 receives the ray data provided through write 44 and arranges for storage of data for the new ray (or rays), including that an identifier for the ray can be created. The identifier can be determined from, based on, or otherwise related to a location in memory 90 where data for the new ray is stored. Where the new ray references another ray, then the data for the new ray can include an identifier for the referenced ray, and attribute source information, as described with respect to FIG. 3.

Using the example of FIG. 2, if shader 21 were directly interfacing with memory 90, and shader 21 were obtaining data for a referencing ray (i.e., a ray that references attributes of another ray), then shader 21 typically would first read data for the referencing ray to determine identifying information for the referenced ray, and in some cases, what attributes are referenced from that ray. Then shader 21 would read those attributes (or the entire data for the referenced ray) from the memory. Thus, in many cases, there would be two separate reads made by shader 21 for a referencing ray.

In FIG. 5, ray read interface 510 can abstract from shaders how rays are stored physically in memory 90. For example, with respect to shader 21, a single read (nominally referred to as read 41 (one of the two reads by shader 21 in FIG. 2) can be made by shader 21. That single read can include identifying information for a ray whose attributes are needed by shader 21. Read interface 510 then can access memory 90, obtain an identifier for the referenced ray(s), and potentially attribute source information, and then access those attributes from memory 90, and provide those attributes in response to the read 41.

Thus, in the example of FIG. 5, a shader need only make one read from memory in order to obtain attributes for a ray, regardless whether that ray is represented in memory by reference to another ray or not.

Ray read interface 510 also can implement read conservation strategies more effectively than each individual shader could implement on its own. For example, ray read interface 510, when it reads data for referenced rays, it also can read a referencing ray count, and for high count rays, read interface 510 can cause attribute data to be cached. In other examples, ray read interface can cache ray attribute data using cache management schemes, such as least recently used, to evict cached ray attribute data. Further, it was described with respect to FIG. 4, that systems can include functionality that can collect or otherwise bin shader ray data read requests based on referenced ray and when a number of requests have been made for attributes of a given referenced ray, then a read to memory can be made. That functionality can be implemented in ray read interface 510. Further functionality also can be implemented with this deferred attribute reading approach. For example, aging of read requests can be implemented, such that requests will begin fulfillment within certain timeframes if fewer than a desired number of other requests are received for a given set of ray attributes (or for entire sets of ray data). For example, in a non-recursive ray tracing approach, it may be acceptable that certain ray intersections are left unshaded for a while during scene rendering, so long as shading and intersection testing resources are being used efficiently, and in fact such deferral can increase efficiency in situations such as where a memory storing ray attribute data may be unable to service a larger number of individual requests and becomes a bottleneck that reduces a utilization of shading processor resources.

FIG. 6 depicts a rendering system method useful in describing exemplary aspects of approaches to ray attribute referencing. In FIG. 6, first ray attribute data can be stored (605) in a memory (e.g., memory 90). The first ray can be tested (610) for intersection with primitives composing a 3-D scene. Such testing can be performed by an intersection testing resource, and would return, where an intersection was detected, an indication of a closest intersection (i.e., a first primitive intersected) for that ray (of course, other intersections detected can be returned, but typically only the closest is of interest). In some intersection testing architectures, an intersection indication also comprise ray identifier information. The intersected primitive is typically associated with a shader code module and that module is identified (615) based on the indicated intersected primitive.

Code of the identified shader module begins execution (620). One aspect of such execution is that further rays can be emitted for intersection testing, and in the depicted method, a second ray is emitted by the shader and data is stored (625) for that second ray. The data stored for the second ray comprises an identifier to the first ray, and attributes source information which attributes of the second ray are shared with or to be sourced from the first ray. As with the first ray, the second ray can be intersection tested (630), and where there is an intersection, a primitive first intersected can be identified, and that intersection would be shaded. In order to shade the intersection of the second ray and the primitive it intersected, attributes for the second ray may need to be obtained. Since the second ray sources one or more attributes from the first ray, first ray attributes are read (635) and used as though there were applied or otherwise specified directly for the second ray.

FIG. 7 depicts an example of maintaining a memory with ray or storing ray data in the memory. In 795, attribute data for a ray to be emitted is received. That attribute data can be compared with attribute data for other rays already stored in memory (710). Where there is a comparison with multiple rays, a ray more similar to the ray to be emitted can be selected (715) and used as a referencing ray. In other examples, the comparison can be with a particular identified ray or other candidate ray that can be provided with the attributes for the ray to be emitted. For example, the method can allow specifying a ray by an approach that allows specifying a ray by indicating that the ray is to be like another ray, except for specified information. In other situations, the attributes can be specified and then a code module can determine what ray should be used as a reference for a ray according to those specified attributes.

Upon determining a ray to be used as a reference, then data descriptive of the to-be-emitted ray (now, the referencing ray) can be formulated to include a reference to the referenced ray (e.g., an identifier for the referenced ray) and attribute source information describing attributes to be sourced from the referenced ray, and information for any attribute that is not sourced from the referenced ray (there typically would be at least one such attribute, or else the rays would be identical).

The data descriptive of the referencing ray can then be stored (725), and referenced for purposes such as intersecting testing and shading.

Elements of the method depicted in FIG. 7 can be implemented by ray emission interface 505 (FIG. 5), in that ray emission interface 505 can maintain index information for rays available to be used as references (referenceable rays), which in some examples is limited only to rays that do not reference another ray for one or more attributes. In situations where a large number of referenceable rays are stored in memory, it may be undesirably complicated or computationally expensive to search for a similar ray, in order to use that ray as a reference. However, heuristics can be maintained to guide such a search. For example, sets of canonical rays can be maintained that would represent common attribute configurations for rendering a particular scene. In other situations, candidate rays can be identified based on what shader emitted a given ray. For example, a number of instances of the same shader code module may have run or be running, due to different primitive intersections, and rays from different instances of the same shader code may be candidates for the referenced ray.

In further examples, bundles of rays can be emitted for storage at the same time, and one ray from a given bundle can serve as the referenced ray with the other rays of the bundle referencing that ray for attributes.

In still further examples, a ray can be determined to reference a set of attributes based on a type associated with that ray. For example, a shader code module can emit a shadow ray, and shadow rays can default to first reference a given set of attributes. Further refinements of the set of attributes to be referenceable can be provided, and which can be viewed as being types of rays or logical subtypes of a broader type. As will be described below, systems can provide interfaces for shader code modules and can select suitable sets of attributes to be used as references for a given ray that is to be emitted by a shader code module, including the usage of such type information, if available.

Further Examples of Implementations of Ray Referencing

In some examples above, it was described that rays can be referenced by use of an identifier for a ray, which can relate to a memory location or be used as an index to identify a location at which the desired ray attributes can be obtained. In other examples, ray referencing can occur programmatically, such that a reference to a ray can be determined by plugging parameters into a referencing expression.

Ray referencing also can be made conditional. For example, an attribute from a referenced ray can be copied under certain conditions. The condition can involve reading from an identified referenced ray structure, and using data there to determine whether to use an attribute from that referenced ray. The condition also can involve state internal to a given shader, or to data within a referencing ray data structure.

Counting of Ray References

In some preferred approaches to ray tracing herein, rays can be traced out of order, such that a ray being referenced might have completed intersection testing and shading and otherwise would be read to be expelled or overwritten in memory. However, other rays may not yet have completed intersection testing and reference that ray; therefore, it should be maintained in memory until all referencing rays complete. Thus, in such implementations, it can be desirable to track information about rays that are referencing such a ray. For example, it was disclosed above that a count can be maintained that tracks a number of rays that are referencing a given ray. As rays complete shading, the count of the referencing rays can be decremented. A physical memory location where such reference counts can be stored can be with other attribute data for the referenced ray, or can be provided in a location with other attribute count information, or in another location as useful for a particular implementation.

In other implementations, further information about referencing rays can be maintained. For example, in some ray tracing implementations, a weight can be an attribute included with a ray, as explained below. A weight can be related to how important that particular ray is to the scene rendering, or to a pixel of the rendering, relative to other rays, such as rays associated with other pixels, or rays that are children of that weighted ray. Characteristics that can be maintained in a referenced ray can relate to statistics about weights of rays that reference the referenced ray. These statistics can be used in decisions concerning whether to shade a particular intersection involving a referencing ray.

In an example, a weight can be predictive of a number of rays that may be emitted during shading of intersections of rays that will be emitted based on that ray, or viewed from a different perspective, a higher weight associated with a first ray can be correlated to a relatively higher position in a ray tree than a ray related to that first ray and having a lower weight, such that more of a ray tree may have yet to be identified for a higher weight ray. In situations where there is a constrained ray resource, such as a constraint in memory for storing rays, it may be desirable to shade rays that are further "down" in the ray tree, as they would be less likely to cause emission of more rays when they and/or their children are shaded. Thus, a weight associated with a referencing ray can be compared, for example, with an average weight of all referencing rays, or with a weight of the referenced ray, in determining whether that referencing ray should proceed to shading or should be deferred and shaded later.

Multiple Ray Referencing

In a preferred implementation, a single level of ray referencing is implemented, such that either a ray is completely specified and independent, or references only one other ray for attributes. Thus, in some cases, a large number of referencing rays can all be referencing the same referenced ray. However, other implementations can provide multiple levels of referencing, such that a referencing ray can reference a ray that also is a referencing ray, and so on. In such cases, intermediate rays between an ultimate referenced ray and the particular referencing ray being considered can overwrite attributes, and the overwritten values can be considered as current until further overwriting occurs.

Other example aspects include referencing multiple rays within a single ray structure. FIG. 3 showed an example ray data structure comprising an identifier for a referenced ray and a bitmask identifying what attributes of that referenced ray are to be used as though they were included with the referencing ray. This concept can be extended to inclusion of multiple ray references and multiple bitmasks, such that attributes can be obtained from a plurality of referenced rays.

Examples of Attributes to Reference

The above description provided examples of how attribute information can be shared among rays, using exemplary ray referencing approaches. Examples of attributes for which data can be included in ray data structures follows.

Origin and direction information is used to specify how a ray travels through a scene. In some cases, one or more of origin and direction of a group of rays can be constant, while the other varies. For example, shader rays for testing occlusion of known light sources all can have similar origins and different directions; Monte Carlo rays also can have similar origins and disparate directions. Another similar formulation can include a common destination for a group of rays, and based on direction or origin information for the rays, the destination information can shared. Thus, a broader formulation of this type of attribute is information specifying a relationship of a given ray or rays to the scene.

Another example includes a screen pixel reference or identifier. Camera rays, as explained with respect to FIG. 1, are emitted through pixels of a 2-D image being rendered. In a non-recursive tracing implementation, there typically is no rollup of color information, but instead, there is direct contribution to a buffer for a screen pixel, for each ray that completes and is related to a particular camera through a potentially long chain of ray intersections that are shaded, and in turn result in more ray emission. Thus, a pixel reference emitted with a camera ray can be an item of data that is referenced by each ray related to that camera ray, which is emitted during shading of various intersections.

Another example of referenceable ray attributes includes an attenuation vector. An attenuation vector would be used to describe, in non-recursive ray tracing, how a first shader affects light that hits it, for the purpose of sending that information to shaders that will be identified by further intersection testing of rays spawned by the first shader. As described above, non-recursive ray tracing can propagate color information in a forward direction, as intersections are being identified, rather than rolling that information up after intersection testing for a particular tree of rays. An attenuation vector can start from a camera ray, and as more rays related to that camera ray are intersection tested, and shaders run as a result, the attenuation vector can represent the collective effect of all the shaders between the original camera run and the present rays being intersection tested. Thus, attenuation vectors can be referenced from a parent ray, although they may also be modified frequently.

Attenuation vectors also can be referenced from sibling rays. For example, if 10 rays will be issued by a frame shader (e.g., a shader operating also as a camera to emit rays from an image plane into the 3-D scene), then nine of those rays can be described with reference to an attenuation vector stored with the tenth ray. Implementations also can describe a difference between a referenced attenuation vector and attenuation between that referenced vector and a current status.

Further examples of ray attributes include a pointer to an executable code module, or instructions that can be executed or otherwise incorporated into downstream shaders. It was described that shader state is often not maintained in non-recursive ray tracing after the shader has performed its calculations, made light energy contributions, and/or emitted further rays for intersection testing. Thus, if a shader in a particular circumstance would want to alter its shading behavior based on downstream shading or intersection testing results, it would not easily be able to implement that alteration where state for that shader is not maintained. This is in contrast with a recursive shader that naturally would retain such ray state by virtue of the recursivity of the algorithm itself. Thus, for such circumstances, an approach to allowing downstream intersection testing results to be reflected in shader behavior can include a shader emitting a ray can include a pointer to code or code to be run after shader completion that effects such shader behavior.

Example System Implementation

Figure 8:
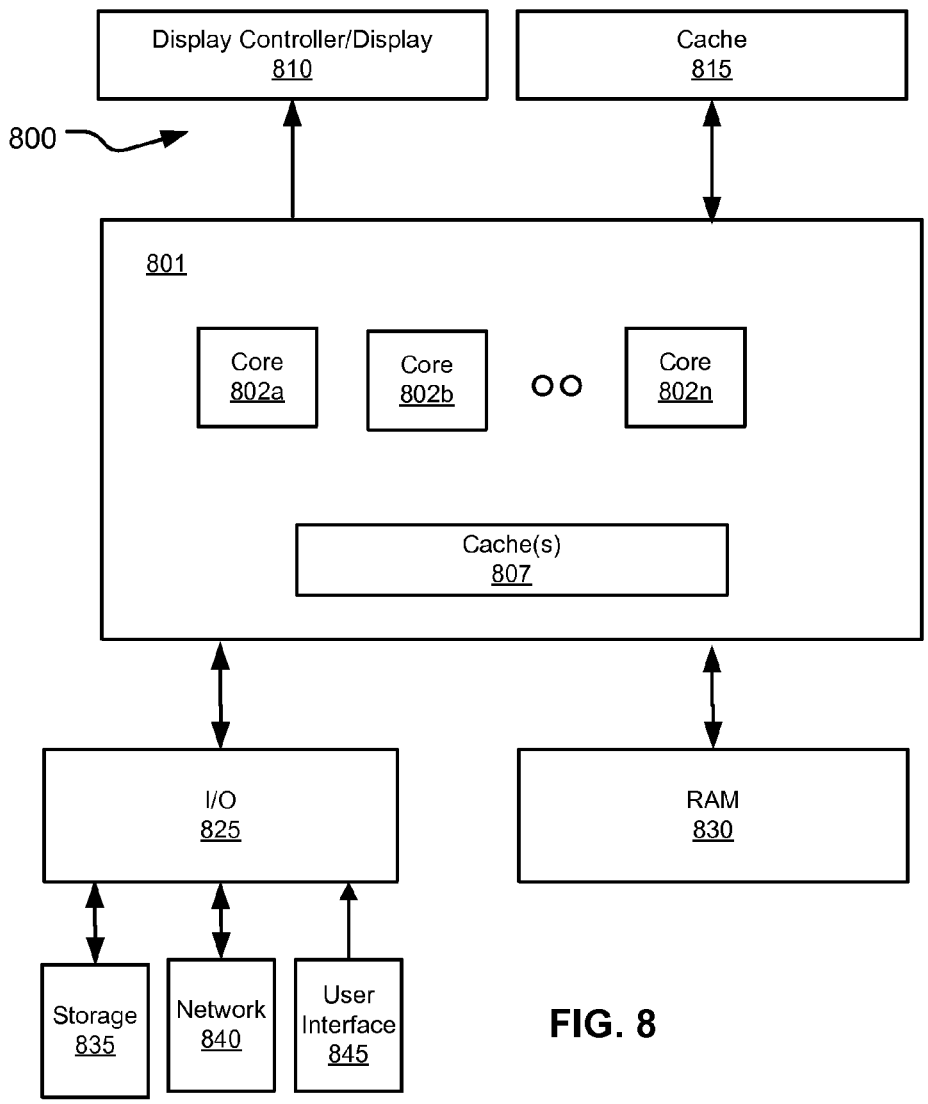
FIG. 8 depicts a system block diagram of an example implementation of a ray tracing rendering according to these disclosures.

FIG. 8 illustrates an example system 800 that can be used to implement aspects described herein. System 800 comprises a computing resource 801 comprising a plurality of cores 802a-802n, with each core potentially identifiable as a logically and/or physically separate sub-unit of computing resource 801, which each can be used to execute operations that can be hard-coded and/or configured using code from computer readable media. For example, each core 802a-802n may represent a thread executing on a multi-threaded machine, a plurality of complete processor resources operable to execute one or more computing threads. Computing resource 101 is operable to communicate with a cache 815, which represents one or more fast access memory components, and which can be assigned to respective core(s) from cores 802a-802n, shared, or some combination of assignment and sharing. A cache 807 also may be included on die with the cores, or in a package or module with the cores. An I/O interface 825 provides access to non-volatile storage 835, examples of which include one or more hard disk drives, a flash drive, DVD, or high-definition storage media. Interface 825 also provides one or more network interfaces 840, which can comprise, for example, Ethernet and 802.11 wireless networking capability, Bluetooth, and so on. Interface 825 also provides access to a user interface 845, which can comprise a mouse, keyboard, microphone, touch screen input, and so on. System 800 also comprises a RAM 830, which communicates with computing resource 101, and can be used for storing code and data used more frequently than code and data stored in storage 835. System 810 also comprises one or more of a display controller and display, collectively identified as 810. In some cases, one or more of cores 802a-802n can be physically located on a graphics card having other display controller logic, and conversely, display control logic can be co-located with computing resource 801.

In some cases, it may be preferable to store rays currently being tested for intersection in caches 815 and/or 807. In some cases, only a portion of the current rays emitted will be currently intersection tested, and a complete copy of the rays can be stored in RAM 830. Primitives describing the scene can be stored in RAM 830, and fetched from there when used in intersection testing. Shaders can be stored in RAM 830, along with texture data. Each core 802a-802n may be assigned to perform intersection testing or shading, or in some cases, may perform an interleaved combination of intersection and shading operations, or concurrent operations in multithreaded designs.

Code modules implementing various functionality described with respect to FIGS. 2-7 can be stored in storage 835, and loaded into RAM 830 (or a combination of RAM 830 and cache 815) with a rendering application, such as a video game, a computer aided design or animation package, and so on.

In sum, any of the functions, features, and other logic described herein can be implemented with a variety of computing resources. A computing resource can be a thread, a core, a processor, a fixed function processing element, and the like. Also, other functions, which are not primarily the focus of this description, can be provided or implemented as a process, thread or task that can be localized to one computing resource or distributed among a plurality of computing resources (e.g., a plurality of threads distributed among a plurality of physical compute resources).

Examples of applications of additional data include attenuation vector(s), associating weights or masses or other physical attributes with rays, mathematical operations such as filtering or blending specifications, flags indicating or influencing shader behavior, executable code (e.g., code for procedural geometry that can modify or influence the scene or objects in the scene), and so on.

Code for any method can be stored in computer readable media, such as solid-state drives, hard drives, CD-ROMs and other optical storage means, transiently in nonvolatile memories as well as embodied in communication signals that are processed. Once processed, information on those signals can be stored in computer readable media that can be accessed by a computer.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Aspects described herein can be implemented as procedures, functions, or calls to such procedures and functions. This description implies no limitation as to a programming methodology that can be used to implement or provide the functionality described as being available through these procedures or functions, so long as software, hardware or a mixture thereof provides a programmer with an ability to access such functionality through an interface provided therefore. In some cases, names were provided for particular concepts; these names imply no requirement as to what code performing these functions need to be called in an implementation.

The various examples described above are provided by way of illustration only and should not be construed as limiting. For example, only a limited example of ray tracing behavior was presented, and it would be understood that practical implementations involve many more rays, and often more concurrent processing thereof. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. More generally, a person of ordinary skill would be able to adapt the disclosures relating to the programming semantic to a variety of other ray tracing/ray shading implementations, and no implied limitation as to its application exists from the systems, methods, and other disclosure used to explain examples thereof.

We claim:

1. A method for processing rays in a ray tracing renderer, comprising:
   storing attribute data for a first ray in a location of a memory;
   identifying a shader module to execute in response to an intersection testing result for the first ray in a 3-D scene;
   providing for execution of the shader module in a processor, wherein the execution results in a second ray for intersection testing;
   storing data for the second ray comprising a reference to the location of the memory storing attribute data for the first ray and data explicitly defining one or more attributes of the second ray;
   accessing attribute source information indicating which second ray attributes are to be obtained from the location of the memory storing attribute data for the first ray and which second ray attributes are explicitly defined by the data stored for the second ray; and
   sourcing, from the location of the memory storing attribute data for the first ray, the attributes indicated to be obtained from the location of the memory storing attribute data for the first ray by the attribute source information, for use in shading an intersection involving the second ray.

2. The method of claim 1, further comprising storing data for a plurality of rays in the memory, data for the plurality of rays comprising respective references to sources of attributes for each ray of the plurality, each reference identifying a memory location storing attribute data for ray different a ray of the plurality of rays associated with that reference.

3. The method of claim 2, wherein the data stored for the plurality of rays further comprises a reference to shared attribute source information descriptive of attributes to be sourced from their respective attribute sources.

4. The method of claim 1, further comprising flagging the first ray as a referenceable ray, and conditioning the storing of data for the second ray comprising the reference to the location of the memory storing attribute data for the first ray based on the first ray being flagged as referenceable.

5. The method of claim 1, wherein the storing of data for the second ray further comprises forming the reference to the location of the memory storing attribute data for the first ray to identify at least a portion of a data structure with attributes associated with the first ray.

6. The method of claim 1, wherein the attribute source information comprises a bit for each attribute of the second ray indicating if that attribute is to be sourced from the location of the memory storing attribute data for the first ray.

7. The method of claim 1, wherein the attribute source information comprises bits indicating whether the second ray has multiple attribute sources.

8. The method of claim 1, wherein the location of the memory storing attribute data for the first ray source of attributes is one source of attributes of a plurality of attribute sources, each source identifiable in the attribute source information by a respective reference.

9. The method of claim 8, wherein each of the plurality of attribute sources is either a data structure associated with a particular ray or a data structure stored in memory made referenceable for use during ray emission.

10. The method of claim 1, further comprising using ray type information associated with the second ray to identify the attribute source information.

11. A non-transitory computer readable medium having stored thereon computer executable code for programming a processor to execute a method of accepting ray data from shader modules, the method comprising:
    storing in one or more locations in a memory one or more attributes identified as being available for reference by rays upon their emission;
    storing data defining a first ray, the definition data for the ray comprising a reference to at least one of the stored attributes;
    running a shader code module in response to an intersection testing result for the ray;
    using the reference to the at least one stored attribute to obtain data defining the at least one stored attribute for use by the shader code module; and
    providing definition data for a second ray, the definition data comprising attribute source information indicating which attributes of the second ray are to be sourced from the one or more attributes stored in the one or more locations in memory, and which attributes of the second ray are explicitly defined in the definition data for the second ray.

12. The non-transitory computer readable medium of claim 11, wherein a plurality of rays reference at least one of the stored attributes, and the method further comprises maintaining a count of a number of rays that reference that stored attribute.

13. The non-transitory computer readable medium of claim 11, wherein the storing data defining the first ray further comprises storing attribute source information indicating which attributes of the first ray are to be defined by reference to the stored attributes.

14. A system for managing ray memory in rendering with ray tracing, comprising:
    a memory for storing ray attribute data;
    a processor configurable with computer executable shader code modules to produce rays to be intersection tested in a 3-D scene, the processor interfacing with the memory; and
    a module configured for effecting storage of definition data for a first ray in a first data structure in the memory, the definition data comprising identification of an attribute of the first ray that is present in a separate second data structure that is already stored in the memory, a reference to the separate second data structure, and data explicitly defining an attribute of the first ray distinct from attributes stored in that separate second data structure.

15. The system of claim 14, wherein the separate data structure is referenced by the first ray and a plurality of other rays for at least one attribute in the separate data structure.

16. The system of claim 14, wherein the module is further configured for identifying a respective type for each ray produced, and for identifying attribute source information indicating which attributes are defined by reference, and which are defined explicitly for that type of ray.

17. The system of claim 16, wherein the memory stores a plurality of rays that are defined for a single ray type, each referencing a respective predecessor ray for an attribute identified by the attribute source information for that single ray type.

18. A non-transitory computer readable medium storing computer executable instructions comprising a shader code module for configuring a processor, the shader code module comprising:

computer executable code to receive identifying information for a first ray that caused the shader code module to be run as a result of intersection testing;

computer executable code for reading definition data for the first ray from a memory location storing a data structure for the first ray;

computer executable code for parsing the definition data to determine whether an attribute of the first ray is defined explicitly in the data structure or by reference to an attribute source other than ray data structure for the first ray;

computer executable code for reading data descriptive of the attribute, for use if the attribute is defined by reference to an attribute source other than the data structure for the first ray; and computer executable code for computing a shading effect using the attribute.

19. The non-transitory computer readable medium of claim 18, wherein the first ray attribute comprises one or more of computer executable code to be executed after completion of the shader code module, and a pointer to computer executable code to be executed after completion of the shader code module.

* * * * *